(12) United States Patent
St-Pierre et al.

(10) Patent No.: US 8,082,120 B2
(45) Date of Patent: Dec. 20, 2011

(54) HAND-HELD SELF-REFERENCED APPARATUS FOR THREE-DIMENSIONAL SCANNING

(75) Inventors: Éric St-Pierre, Lévis Québec (CA); Pierre-Luc Gagné, Lévis Québec (CA); Antoine Thomas Caron, Québec Québec (CA); Nicolas Beaupré, Québec Québec (CA); Dragan Tubic, Québec Québec (CA); Patrick Hébert, Québec Québec (CA)

(73) Assignee: Creaform Inc., Levis, Quebec (CA)

( * ) Notice: Subject to any disclaimer, the term of this patent is extended or adjusted under 35 U.S.C. 154(b) by 222 days.

(21) Appl. No.: 12/629,279

(22) Filed: Dec. 2, 2009

(65) Prior Publication Data

US 2010/0134598 A1     Jun. 3, 2010

Related U.S. Application Data

(63) Continuation-in-part of application No. 11/817,300, filed as application No. PCT/CA2006/000370 on Mar. 13, 2006, now Pat. No. 7,912,673.

(60) Provisional application No. 60/660,471, filed on Mar. 11, 2005.

(51) Int. Cl.
*H04N 13/02* (2006.01)

(52) U.S. Cl. ............... 702/85; 702/84; 702/94; 702/95; 702/127; 702/150; 702/152; 702/153; 702/155; 702/156; 702/157; 702/158; 702/159; 702/167; 702/168; 702/189; 382/285; 382/291; 382/295; 382/312; 382/313; 382/318; 382/321; 256/601; 256/602; 256/603; 256/606; 256/608

(58) Field of Classification Search .................... 702/84, 702/85, 94, 95, 127, 150, 152, 153, 155–159, 702/167, 168, 189; 382/285, 291, 295, 312, 313, 318, 321; 256/601–603, 606–608, 312, 614, 620–623, 4.01, 4.03, 610
See application file for complete search history.

(56) References Cited

U.S. PATENT DOCUMENTS 4,645,348 A     2/1987   Dewar et al.
(Continued)

FOREIGN PATENT DOCUMENTS

DE          19502459          8/1996
(Continued)

OTHER PUBLICATIONS

Carsten Reich et al., 3-D shape measurement of complex objects by combining photogrammetry and fringe projection, Optical Engineering, Society of Photo-Optical Instrumentation Engineers, Vol. 39 (1) Jan. 2000, pp. 224-231, USA.

(Continued)

*Primary Examiner* — Sujoy Kundu
(74) *Attorney, Agent, or Firm* — Fasken Martineau

(57) ABSTRACT

A method and hand-held scanning apparatus for three-dimensional scanning of an object is described. The hand-held self-referenced scanning apparatus has a light source for illuminating retro-reflective markers, the retro-reflective markers being provided at fixed positions on or around the object, a photogrammetric high-resolution camera, a pattern projector for providing a projected pattern on a surface of the object; at least a pair of basic cameras, the basic camera cooperating with light sources, the projected pattern and at least a portion of the retro-reflective markers being apparent on the 2D images, a frame for holding all components in position within the hand-held apparatus, the frame having a handle, the frame allowing support and free movement of the scanning apparatus by a user.

23 Claims, 8 Drawing Sheets

U.S. PATENT DOCUMENTS

| | | | |
|---|---|---|---|
| 5,410,141 | A | 4/1995 | Koenck et al. |
| 5,661,667 | A | 8/1997 | Rueb et al. |
| 6,101,455 | A | 8/2000 | Davis |
| 6,246,468 | B1 | 6/2001 | Dimsdale |
| 6,508,403 | B2 | 1/2003 | Arsenault et al. |
| 6,542,249 | B1 | 4/2003 | Kofman et al. |
| 7,487,063 | B2 | 2/2009 | Tubic et al. |
| 2002/0041282 | A1 | 4/2002 | Kitaguchi et al. |
| 2008/0201101 | A1 | 8/2008 | Hebert et al. |

FOREIGN PATENT DOCUMENTS

| | | |
|---|---|---|
| DE | 19634254 | 3/1997 |
| DE | 19925462 | 2/2001 |
| JP | 04172213 | 6/1992 |
| JP | 07012534 | 1/1995 |
| JP | 11101623 | 4/1999 |
| JP | 2001119722 | 4/2001 |
| WO | 0114830 | 3/2001 |
| WO | 0169172 | 9/2001 |
| WO | 03062744 | 7/2003 |

OTHER PUBLICATIONS

F. Blais, "A Review of 20 Years of Range Sensor Development", in proceedings of SPIE-IS&T Electronic Imaging, SPIE vol. 5013, 2003, pp. 62-76.

S. Rusinkiewicz et al., "Real-Time 3D Model Acquisition", in ACM Transactions on Graphics, vol. 21, No. 3, Jul. 2002, pp. 438-446.

F. Blais et al. "Accurate 3D Acquisition of Freely Moving Objects", in proc. of the Second International Symposium on 3D Data Processing, Visualization and Transmission, Sep. 6-9, 2004, NRC 47141, Thessaloniki, Greece.

P. Hébert, "A Self-Referenced Hand-Held Range Sensor", in proc. of the 3rd International Conference on 3D Digital Imaging and Modeling (3DIM2001), May 28-Jun. 1, 2001, Québec City, Canada, pp. 5-12.

Pappa et al., "Dot-Projection Photogrammetry and Videogrammetry of Gossamer Space Structures", NASA/TM-2003-212146, Jan. 2003, Langley Research Center, Hampton, Virginia 23681-2199.

J.Y. Bouguet et al., "3D Photography Using Shadows in Dual-Space Geometry", Int. Journal of Computer Vision, vol. 35, No. 2, Nov.-Dec. 1999, pp. 129-149.

M. W. Walker et al., "Estimating 3-D location parameters using dual numbers quaternions", CVGIP : Image Understanding, Nov. 1991, vol. 54, No. 3, pp. 358-367.

E. Trucco et al., Introductory techniques for 3-D computer vision, Prentice Hall, 1998, p. 101-108.

M. Fischler et al., "Random sample consensus : A paradigm for model fitting with applications to image analysis and automated cartography", Communications of the Assoc. for Computing Machinery, Jun. 1981, vol. 24, No. 6, pp. 381-395.

HAND-HELD SELF-REFERENCED APPARATUS FOR THREE-DIMENSIONAL SCANNING

CROSS-REFERENCE TO RELATED APPLICATION

The present application is a continuation-in-part of U.S. patent application Ser. No. 11/817,300 filed Aug. 28, 2007 by Applicants, and published under no. US 2008/0201101, now U.S. Pat. No. 7,912,673, which is a national stage entry of PCT patent application Ser. No. PCT/CA06/00370 filed Mar. 13, 2006 which in turn claimed priority of U.S. provisional patent application No. 60/660,471 filed Mar. 11, 2005, the specifications of which are hereby incorporated by reference.

TECHNICAL FIELD

The present invention generally relates to the field of three-dimensional scanning of an object's surface geometry and, more particularly, to a portable three-dimensional scanning apparatus for hand-held operations.

BACKGROUND OF THE ART

Three-dimensional scanning and digitization of the surface geometry of objects is commonly used in many industries and services and their applications are numerous. A few examples of such applications are: 3D inspection and measurement of shape conformity in industrial production systems, digitization of clay models for industrial design and styling applications, reverse engineering of existing parts with complex geometry, interactive visualization of objects in multimedia applications, three-dimensional documentation of artwork and artefacts, human body scanning for biometry or better adaptation of orthoses.

The shape of an object is scanned and digitized using a ranging sensor that measures the distance between the sensor and a set of points on the surface. Different principles have been developed for optical range sensors (see F. Blais, "A Review of 20 Years of Range Sensor Development", in proceedings of SPIE-IS&T Electronic Imaging, SPIE Vol. 5013, 2003, pp. 62-76) that make it possible to capture a dense set of measurements on the object surface. From these measurements, three dimensional coordinates of points on the target surface are obtained in the sensor reference frame. From a given viewpoint, the ranging sensor can only acquire distance measurements on the visible portion of the surface. To digitize the whole object, the sensor is therefore moved to a plurality of viewpoints in order to acquire sets of range measurements that cover the entire surface. A model of the object's surface geometry can be built from the whole set of range measurements provided in the same global coordinate system.

While acquiring the measurements, the sensor can be moved around the object using a mechanical system or can be hand-held for more versatility. Portable hand-held systems are especially useful for rapid scanning and for objects that are scanned on site. Using a hand-held system, the main challenge is to continuously estimate the position and orientation (6 degrees of freedom) of the apparatus in a global coordinate system fixed relative to the object. This can be accomplished using a positioning device coupled to the range scanner. The positioning device can be electromagnetic (see for example products by Polhemus), mechanical (see for example products by Faro), optical (see for example products by Steinbichler) or ultrasonic (see Arsenault et al., "Portable apparatus for 3-dimensional scanning", U.S. Pat. No. 6,508,403 B2, Jan. 21, 2003). Using a positioning device significantly increases the complexity and cost of the apparatus. It is also cumbersome or, in some cases, noisy enough to limit the quality of the integrated data.

To avoid the usage of an external positioning device, an alternative consists of using the 3D measurements collected on a rigid object in order to compute the relative position and orientation between the apparatus and the object. It is even possible to hold and displace the object in hand while scanning (see S. Rusinkiewicz, O. Hall-Holt and M. Levoy, "Real-Time 3D Model Acquisition", in ACM Transactions on Graphics, vol. 21, no. 3, July 2002, pp. 438-446, F. Blais, M. and G. Godin, "Accurate 3D Acquisition of Freely Moving Objects," in proc. of the Second International Symposium on 3D Data Processing, Visualization and Transmission. Thessaloniki, Greece. Sep. 6-9, 2004. NRC 47141). This idea of integrating the computation of the position directly into the system while exploiting measurement is interesting but these systems depend completely on the geometry of the object and it is not possible to ensure that an accurate estimate of the pose be maintained. For example, objects whose geometry varies smoothly or objects with local symmetries including spherical, cylindrical or nearly planar shapes, lead to non constant quality in positioning.

To circumvent this limitation, one can exploit principles of photogrammetry by using fixed points or features that can be re-observed from various viewpoints in the scene. These positioning features can be natural points in the scene but in many cases their density or quality is not sufficient and positioning markers are set in the scene. One may thus collect a set of images and model the 3D set of positioning features in a same global coordinate system. One can further combine this principle using a camera with a 3D surface scanner. The complementarity of photogrammetry and range sensing has been exploited (see products by GOM mbH, CogniTens Ltd. and Steinbichler Optotechnik GmbH) where a white light projector is used with cameras that observe the illuminated scene including positioning features (markers). Using this type of system, a photogrammetric model of the set of markers is measured and built beforehand, using a digital camera. Then, the 3D sensor apparatus is displaced at a set of fixed positions to measure the surface geometry. The range images can be registered to the formerly constructed model of positioning features since the 3D sensor apparatus can detect the positioning markers.

An interesting idea is to integrate within the same system, a hand-held scanner projecting a laser light pattern along with the capability of self-referencing while simultaneously observing positioning features. Hebert (see P. Hebert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) proposed to project laser points on the object to be scanned with an external fixed projector to help position the hand-held sensor. This type of system can be improved by making it capable of building a model of the positioning feature points dynamically. Moreover, the 3D range scanner device was improved to simultaneously capture 3D surface points along with positioning features obtained from retro-reflective markers (see US Patent Publication No. 2008/0201101).

While the sensor projects a laser pattern to recover dense 3D surface points, it also projects light from LED in order to recover a signal on the light detectors, arising from the reflection of light on the retro-reflective markers that are fixed in the observed scene. The system can then simultaneously build a 3D model of these reference markers for positioning while acquiring a dense set of 3D surface measurements.

Nevertheless, there are constraints related to the usage of such a hand-held system. In order to obtain high accuracy for 3D surface measurements, the sensing device must acquire data while being as close as possible to the surface to be scanned. This imposes a reduced field of view on the object and consequently, the distance between retro-reflective markers must be reduced. For larger objects such as vehicles or architectural structures that exceed the working volume size of one cubed meter, this becomes not optimal when it is necessary to scan the whole object surface or when it is necessary to scan sections of these objects but in a common global coordinate system. Actually, positioning errors accumulate and affect the accuracy of the recovered 3D surface model.

SUMMARY

For large objects, it is a great advantage to capture large sets of positioning markers in one or a few snapshots. Using a high-resolution photogrammetric camera, one can actually obtain higher accuracy on the integrated sets of markers into a single model, after bundle adjustment. These markers are typically stuck on the surface of the object at a distance of 10 to 15 cm between each other. The photogrammetric camera makes it possible to capture an accurate model when viewed at a farther distance such as for example, more than 1.5 m. Using this 3D model of the positioning markers, one can then use a self-referencing laser scanner to gather sets of high density 3D surface points on the surface of an object. The density of these 3D surface points may easily exceed several points per square millimeter. For that purpose, the laser scanner calculates its position and orientation from the observed positioning markers and matches them with the 3D model of these markers. The laser scanner then benefits from an accurate model of the markers while measuring dense sets of points at short distance, typically from 250 to 400 millimeters to the object's surface. Actually, when using triangulation-based 3D sensors, the accuracy of these dense sets of points is inversely proportional to the square of the distance between the sensor and the object's surface.

The present invention thus makes it possible to improve the accuracy of the hand-held self-referencing device described in US Patent Publication No. 2008/0201101 for large objects by eliminating these two conflicting objectives. The 3D model of the positioning markers can be captured at a farther distance from the object using the observations from the photogrammetric camera before exploiting this recovered information to help position the self-referenced 3D scanner at short distance from the surface. Consequently, the accuracy of the final high-density surface model can be increased.

Additionally, the present invention can reduce acquisition time when only separated surface sections of a large object are scanned within the same global coordinate system.

By combining a photogrammetric camera and two additional cameras coupled with a pattern projector in a same scanning apparatus, it is possible to easily and rapidly capture large sets of reference markers from wide snapshots of the object and then capture accurate and dense sets of 3D surface points at closer range while always exploiting the reference marker model. The capture of large sets of reference markers using the photogrammetric camera contributes to the improved accuracy of the final surface model.

One additional feature arising from the integrated hand-held device is the possibility to capture the reference marker model in the first stage and then selectively acquire dense surface points on some local surface sections of the object. These local surface sections are automatically calculated within the same global coordinate system and thus make it possible to extract additional surface markers on the object. This added capability can be useful, for example, in the field of 3D inspection in the automotive industry where large objects such as cars or trucks are assembled.

A method and hand-held scanning apparatus for three-dimensional scanning of an object is described. The hand-held self-referenced scanning apparatus has a light source for illuminating retro-reflective markers, the retro-reflective markers being provided at fixed positions on or around the object, a photogrammetric high-resolution camera, a pattern projector for providing a projected pattern on a surface of the object; at least a pair of basic cameras, the basic camera cooperating with light sources, the projected pattern and at least a portion of the retro-reflective markers being apparent on the images, a frame for holding all components in position within the hand-held apparatus, the frame having a handle, the frame allowing support and free movement of the scanning apparatus by a user.

One aspect of the invention provides a hand-held self-referenced scanning apparatus. The hand-held scanning apparatus comprises a first light source for illuminating at least one marker of a set of retro-reflective markers, wherein each marker of the set of retro-reflective markers is provided at a fixed position one of on and near the object, the first light source being adapted to illuminate the marker at a photogrammetric modeling distance of more than 75 cm to the object; a photogrammetric high-resolution camera for acquiring and storing at least one photogrammetric image of the object, the photogrammetric high-resolution camera cooperating with the first light source, wherein at least a portion of the set of retro-reflective markers is apparent on the photogrammetric image, the photogrammetric high-resolution camera being adapted to acquire the photogrammetric image at the photogrammetric modeling distance; a pattern projector for providing a projected pattern on a surface of the object; at least a pair of second light sources, each the second light sources for illuminating at least one marker of the set of retro-reflective markers, the second light source being adapted to illuminate the marker at a surface scanning distance of less than 45 cm from the object; at least a pair of basic cameras for acquiring and storing 2D images of the object, one 2D image from each basic camera, each the basic camera cooperating with one of the second light sources, wherein the projected pattern and at least a portion of the set of retro-reflective markers is apparent on the 2D images, a spatial relationship between the pair of basic cameras being known, the basic cameras being adapted to acquire the 2D images at the surface scanning distance; a frame for holding in position the first light source, the photogrammetric high-resolution camera, the pattern projector, the basic cameras and the at least a pair of second light sources within the hand-held apparatus, the frame having a handle, the frame allowing support and free movement of the scanning apparatus by a user; whereby the user may freely handle the hand-held self-referencing scanning apparatus to build a 3D model of the markers and then obtain dense sets of 3D surface points from the 2D images.

Another aspect of the invention provides a method for three-dimensional scanning of an object. The method comprises obtaining at least one photogrammetric image of the object from a hand-held self-referenced scanning apparatus, extracting markers from the at least one photogrammetric images; building a 3D model of the markers; obtaining at least two 2D images of the object using the scanning apparatus; positioning the at least two 2D images of the object in the 3D model of the markers; extracting dense sets of 3D surface points from the at least two self-referenced 2D images; whereby the user may freely handle the hand-held self-referencing scanning apparatus to build a 3D model of the markers and then obtain dense sets of 3D surface points from the 2D images.

BRIEF DESCRIPTION OF THE DRAWINGS

Having thus generally described the nature of the invention, reference will now be made to the accompanying drawings, in which:

FIG. 5 comprises FIGS. 5A and 5B, in which

It will be noted that throughout the appended drawings, like features are identified by like reference numerals.

DETAILED DESCRIPTION

Figure 1:
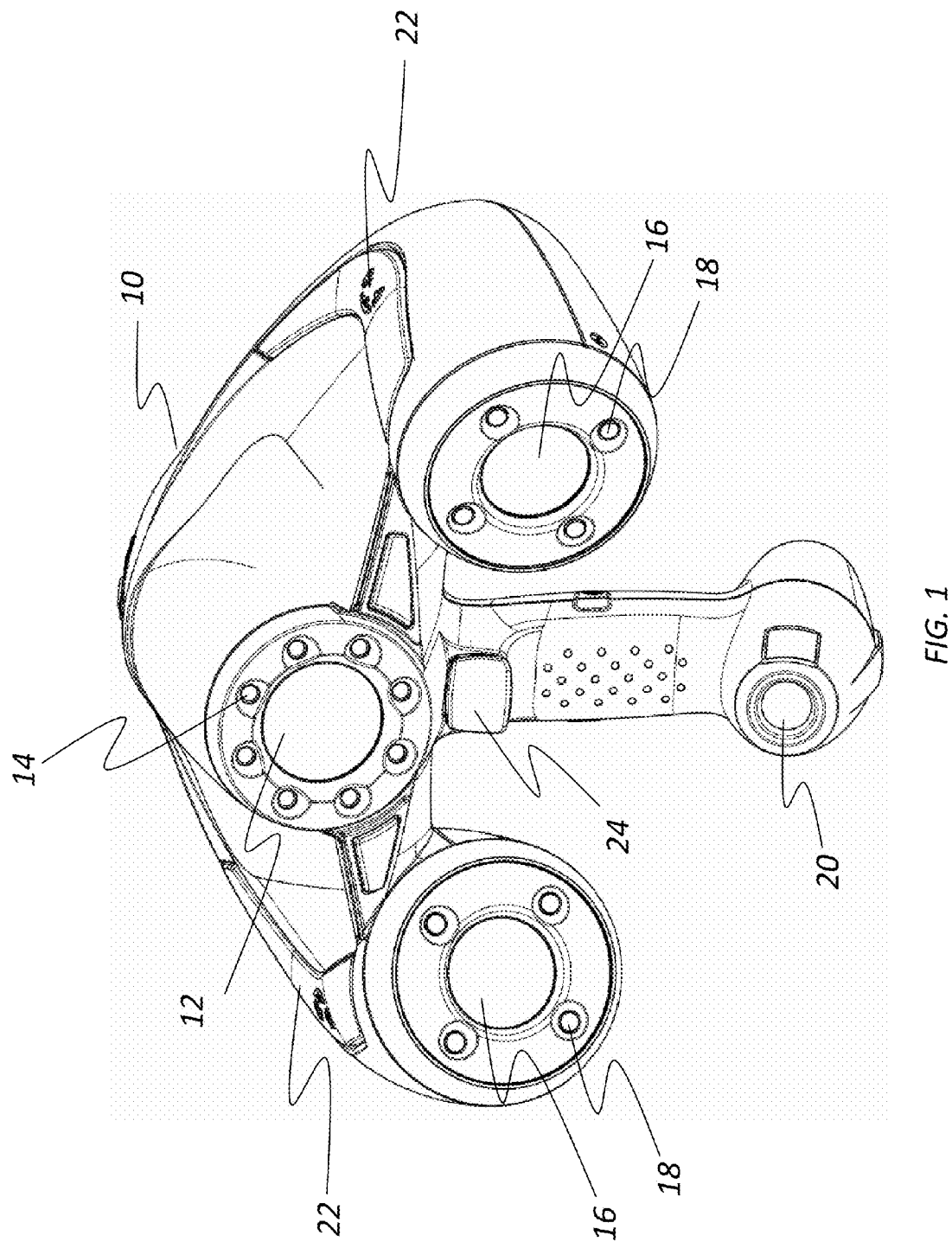
FIG. 1 is a front perspective view of an example embodiment.

Referring now to FIG. 1, a 3-D scanning apparatus is generally shown at 10. The 3-D scanning apparatus 10 comprises a set of photogrammetric high-resolution camera with optics and filter 12, hereinafter referred to as photogrammetric camera 12. Different manufacturers of cameras provide cameras with adequate performances (Sony for example). Although there is no restriction on the position of the high-resolution camera, it can, for example, be positioned in the center of the scanning apparatus while aiming forward. The resolution of the high-resolution camera can, for example, exceed two megapixels and the focal length of the optics should be small enough for providing a wide field of view, typically higher than 50 degrees. The optics can be manufactured by Pentax for example. This provides a 1.4 m horizontal field of view at a distance of 1.5 m. The filter is adapted to the light emitting diodes (LEDs) shown at 14. Typically the wavelength is set in the range of red visible spectrum but this is not a restriction. These LEDs project light towards the scene and then the light is reflected on the retro-reflective markers before coming back towards the LEDs. The reflected light is captured by the photogrammetric camera in order to produce a signal from the retro-reflective markers. In FIG. 1, eight LEDs are drawn at 14 but this number can be different as long as the recovered signal is strong enough to be extracted from the image background. In FIG. 1, the LEDs 14 are shown as being provided on a ring light which surround the photogrammetric camera 12. As will be understood, the LEDs 14 should be close to the photogrammetric camera 12 to ensure that the reflected light is captured by the photogrammetric camera 12 but they need not be provided on a ring surrounding the photogrammetric camera 12. LEDs 14 may be nearly coaxial with the photogrammetric camera 12. As will also be understood, the LEDs 14 could be replaced by another light source which would illuminate the retro-reflective markers on the object.

Still referring to FIG. 1, the 3-D scanning apparatus is complemented with two sets of basic cameras, optics, and filters shown at 16, hereinafter referred to as basic cameras 16. To each basic camera 16, LEDs are added for the same purpose of recovering signal from the retro-reflective markers. The number of LEDs, shown at 18, is smaller in this case since these basic cameras 16 operate at closer range from the object. The LEDs at 14 and 18 can be of the same type; for example, all emitting red light. As will also be understood, the LEDs 18 could be replaced by another light source which would illuminate the retro-reflective markers on the object.

Typically, the standoff distance when operating with these sets of cameras, is 30 centimeters. These basic cameras are monochromic and their field of view is set typically to 60 degrees. Their resolution is also typically set to at least 0.3 megapixels. While used for positioning, these basic cameras 16 also capture the laser pattern that is projected by the laser pattern projector shown at 20. The laser pattern projector 20 can be a class II laser which is eye-safe. Coherent inc. is an example of a manufacturer of these laser projectors. It can project a red crosshair pattern. The fan angle of the laser pattern projector 20 can be 45 degrees. The combination of these basic cameras along with the laser pattern projector follows the description set in US Patent Publication No. 2008/0201101.

Figure 2:
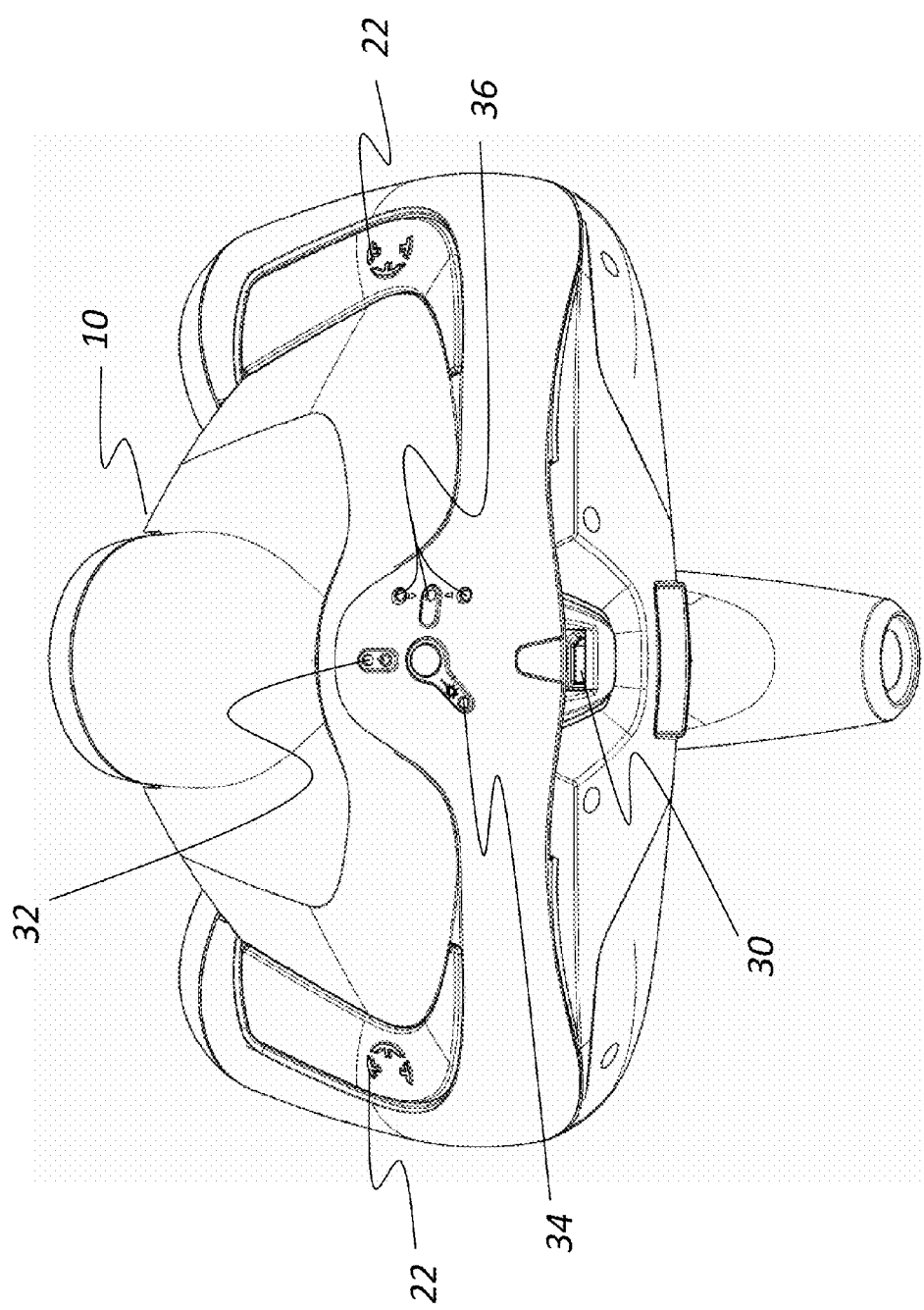
FIG. 2 is a rear top view of the example embodiment of FIG. 1.

FIG. 2 depicts a rear view of the 3-D scanning apparatus shown at 10. In this example embodiment, an IEEE 1394a cable provides a power and data link between the scanning apparatus and a computing device. The connector is shown at 30. The switches are shown at 22. Moreover, five status LEDs are mounted on the scanning apparatus. The three LEDs at 36 are activated to display whether the sensor is too close, too far or at adequate range from the object. While in the first two cases a red LED is activated, a green led located in the middle of the three-LED arrangement, is activated. The LED at 32 indicates whether the power is on or off. Finally, the LED at 34 is activated when the device is recording 3-D measurements using the laser pattern.

The dimensions of the scanning apparatus are 172×260×216 millimeters. Besides the basic cameras 16, the associated LEDs 18, the photogrammetric camera 12 and the associated LEDs shown at 14, the laser pattern projector 20, and the switches shown at 22 and 24, the scanning apparatus integrates a control circuit for activating the three cameras, their associated LEDs, the laser projector and the status LEDs. It also recovers input signal from the switches. Finally, the scanning apparatus also integrates a hub for pipelining the images recovered from the cameras into the IEEE 1394a cable.

Figure 3A:
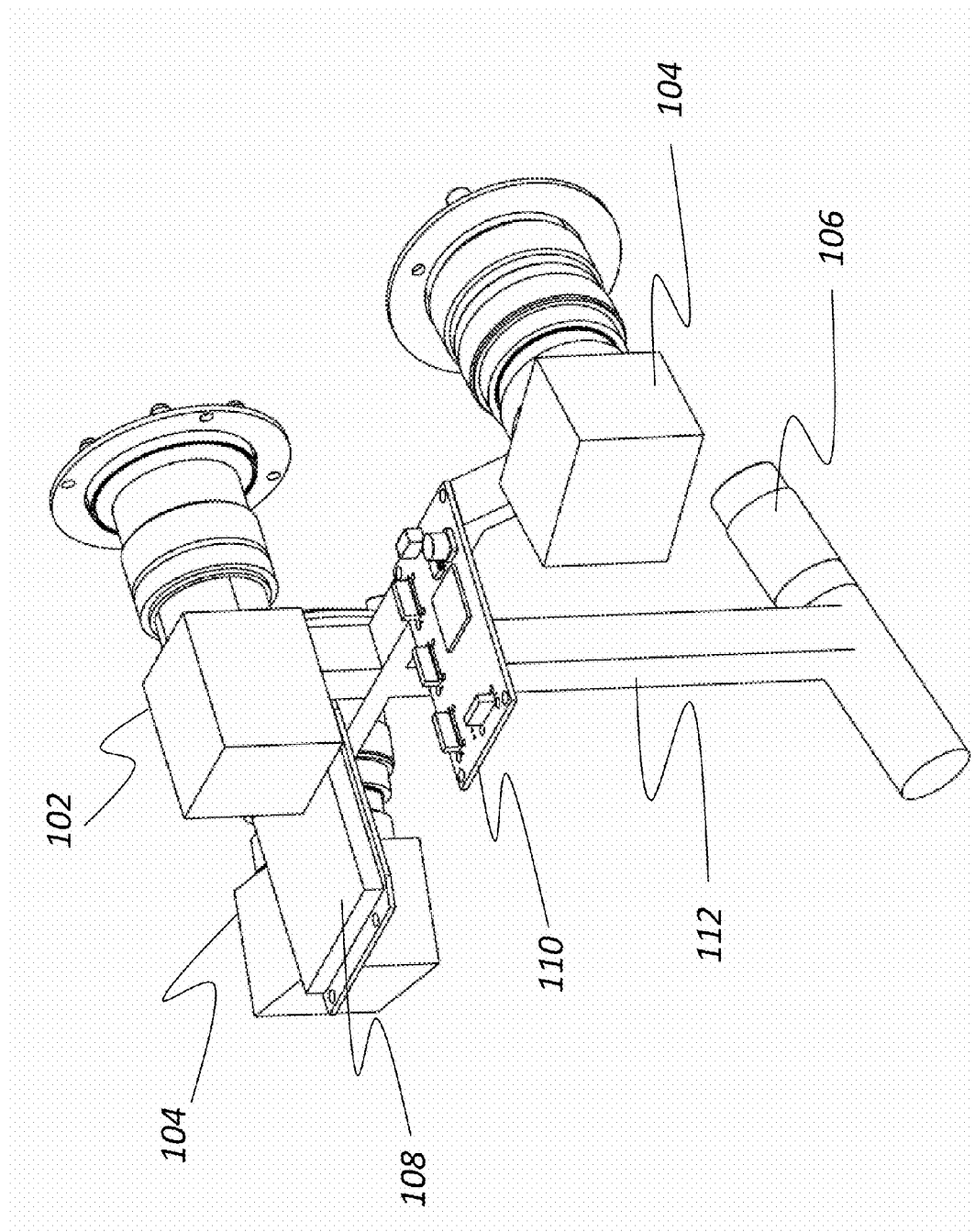
FIG. 3 comprises FIGS. 3A, 3B, and 3C which are a rear perspective view, a front view and a front perspective view of an example of the internal structure of the example embodiment of FIG. 1.
Figure 3B:
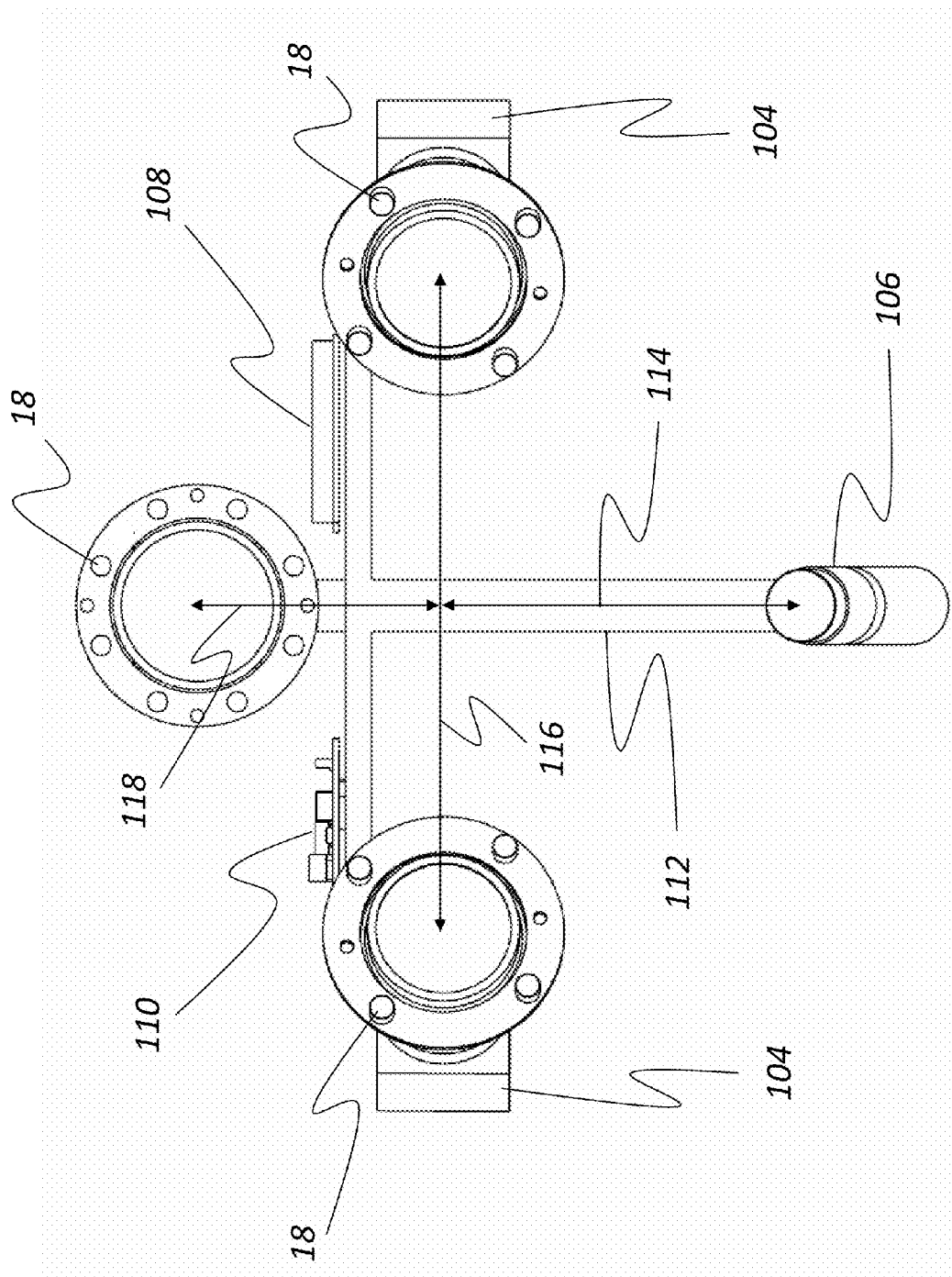
Figure 3C:
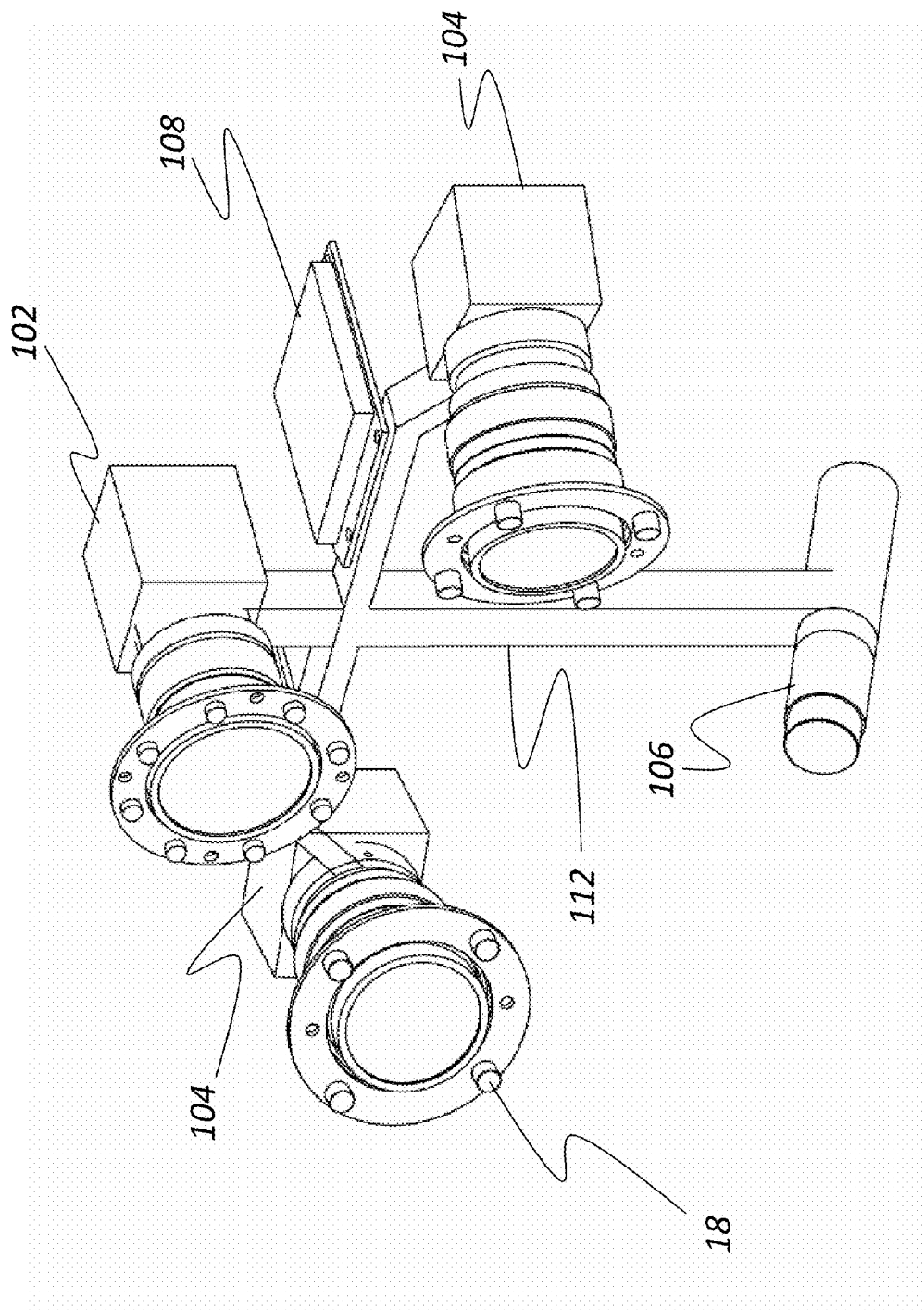

In FIGS. 3A, 3B, and 3C, the internal structure of the scanning apparatus shows the components that are mounted on a t-shaped frame shown at 112. The two basic cameras 104 are separated by a baseline 116 typically set to 190 millimeters. The distance 118 between this baseline axis and the center of the photogrammetric camera may be arbitrary; a typical value of 60 millimeters is shown. Finally, the distance 114 between the same axis and the laser projector 106 is, for example, set such that the triangle composed of the two basic cameras and the laser projector is isosceles. The orientation of the basic cameras and the laser projector can also be adjusted in such a way that their optical axes converge at a single point on the surface of the object. In this example embodiment, this distance is set to 300 millimeters. These figures also show the two circuit boards mounted within the casing: the camera hub shown at 110 and the control circuit shown at 108.

In a typical setup, some coded retro-reflective markers are stuck on the object but they need not to be coded. These coded markers are standard and well-known for anyone skilled in the art of photogrammetry. The coded retro-reflective markers are provided at a typical distance of 500 mm to 600 mm between each other and they are distributed uniformly on the object to capture. They facilitate matching between images at the step of producing a 3D model of the positioning markers. When the object stays fixed in the scene, markers need not to be stuck only on the object to be scanned. They can also be provided in the surrounding environment of the object to capture. Besides the coded retro-reflective markers, non-coded retro-reflective markers are also stuck on or around the object at closer distance. These markers make it possible for the laser scanner to self-reference. For the non-coded markers, the average distance between each other is 10 to 15 centimeters. Typically, the user sticks the retro-reflective markers on the object before collecting a set of images using the scanning apparatus.

The 3-D scanning apparatus operates in two different modes.

In the first mode, only the photogrammetric camera is activated to capture images all around the object or for a specific section of the object. In FIG. 1, the photogrammetric camera 12 is activated simultaneously with the LEDs 14 by pressing a switch button 24. The control circuit board receives the signal from the switch button and activates both the photogrammetric camera and the LEDs. On the scanning apparatus, additional switch buttons 22 are mounted on the device in order to facilitate hand-held manipulation. They are connected to the circuit control board and their role is the same as the switch button 24. This multi-switch system significantly improves ergonomy for the hand-held device. Images can be captured at middle range from the object, that is approximately at a distance of 1.75 m. This part of the process, namely the 3D positioning markers modeling, aims at obtaining a sparse 3D model of the object—or the scene—based on photogrammetric techniques such as bundle adjustment, which is well known to anyone skilled in the art. The model consists of a set of the 3D positioning markers distributed all around the object. These markers can be recognized individually when coded markers are used. Otherwise, they are identified based on their geometric distribution in space. Several algorithms have been developed for this later approach (see US Patent Publication No. 2008/0201101).

Figures 5A, 5B:
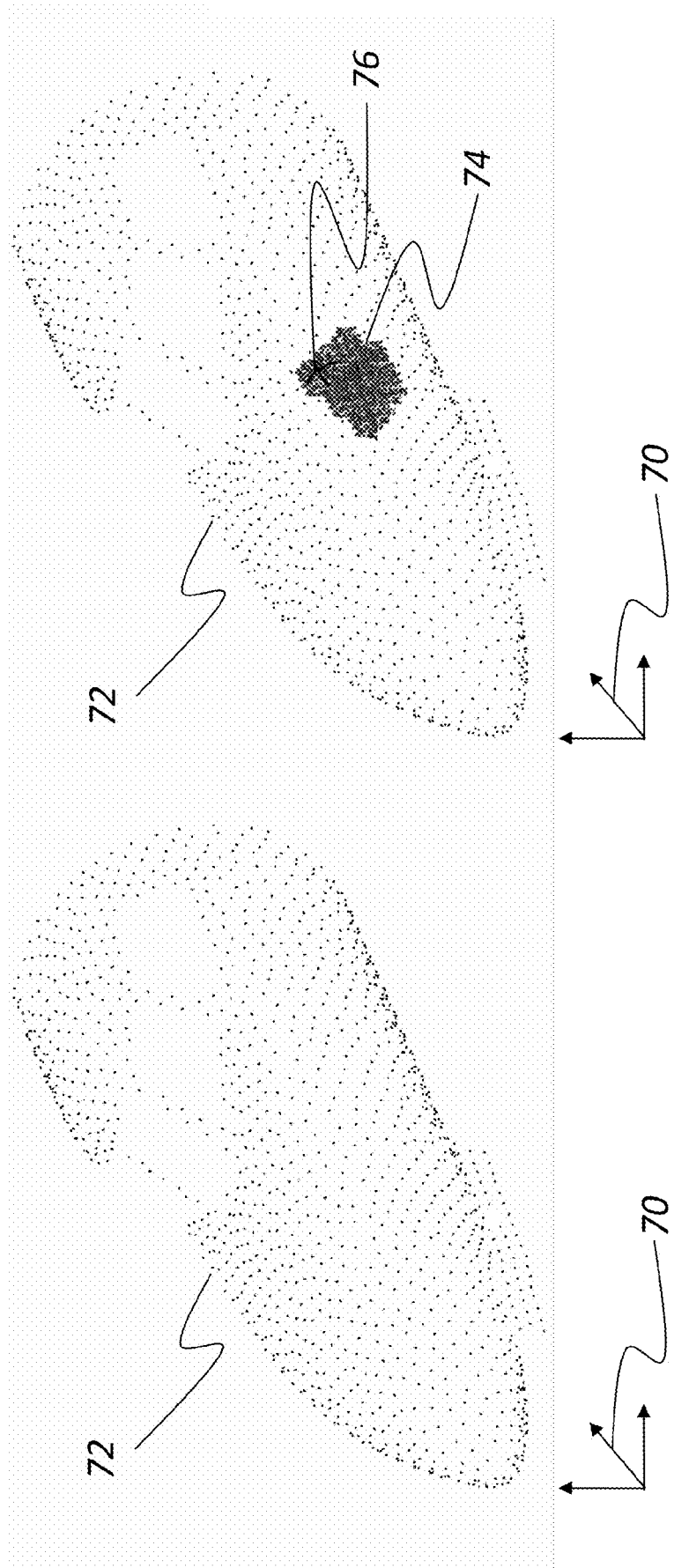
FIG. 5A is a schematic representation of data obtained after the capture of a photogrammetric model of FIG. 4
FIG. 5B is a schematic representation of data obtained after the capture of dense sets of 3D surface points of FIG. 4.

The captured images pass through a hub that feeds them into the IEEE 1394a cable for wired transmission but could be transmitted wirelessly by a transmitter to a computing device that is typically outside the acquisition sensor. The images are processed to extract the signal produced by the reflected light on the reference markers and finally, a bundle adjustment algorithm is applied to provide the 3D model of photogrammetric reference markers. Once this 3D model is calculated, the user prefers to visualize it on a screen display. FIG. 5A illustrates such a model. Then, he activates the second mode for the scanning apparatus. In this mode, the basic cameras 16, the LEDs 18 and the laser pattern projector 20 are activated for acquiring a dense set of points on the object's surface.

In this second mode, the scanning apparatus 10 acquires two images at a time to simultaneously capture the signal from the reflected light emitted by the laser pattern projector 20 and the light emitted by the LEDs shown at 18 and reflected on the retro-reflective markers. For this later purpose, the principle is the same as in the first stage with the photogrammetric camera. LEDs 18 are thus provided around or nearly coaxial with the two basic cameras 16. Images are sent to a calculating device through the same hub and cable. They can also be transmitted wirelessly. Image processing and optionally, 3-D modeling of the reference markers, are performed before calculating the 6 degree of freedom (3 translations and 3 angular parameters) pose of the sensor and calculating the dense set of 3D surface points. For a given image frame, the dense set of 3D surface points is obtained from the reflected pattern on the object. As opposed to 3-D points located at the reference marker positions, the signal recovered from the reflected light originating from the laser pattern projector makes it possible to recover points at much higher density on the surface of the object, typically several points per square millimeter on the object's surface. FIG. 5B illustrates the results while this acquisition process is ongoing. For reaching higher accuracy, the hand-held sensor can be positioned at close range from the object. This is typically between 250 and 400 mm. For the purpose of this second mode, a method is described in US Patent Publication No. 2008/0201101.

Figure 4:
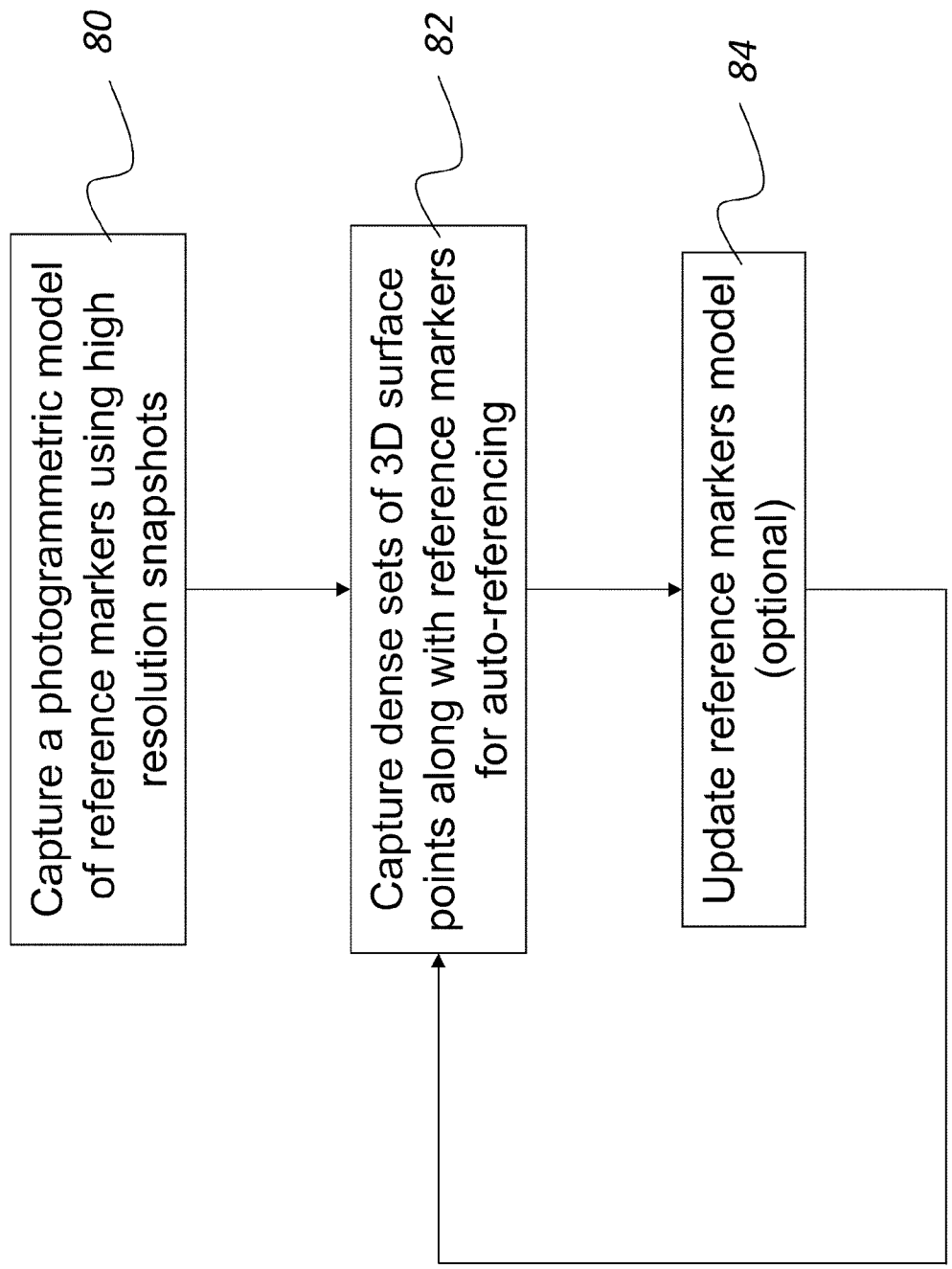
FIG. 4 is a flow chart of main steps of an embodiment.

It is worth noting that using this later referenced method, additional positioning markers can be added to the scene while operating in this second mode. In this case, the system integrates the new markers online while acquiring the dense set of surface points. This optional stage 84 is represented in FIG. 4 along with the capture of a photogrammetric model of reference markers using high-resolution snapshots 80 and the capture of dense sets of 3D surface points along with reference markers for self-referencing 82. The result after step 80 is depicted in FIG. 5A where the 3D model of the positioning markers is shown at 72 into a global coordinate system shown at 70. In FIG. 5B, a dense set of points during laser scanning of the surface, is shown at 74 along with the reflected crosshair laser pattern shown at 76.

Figure 6B:
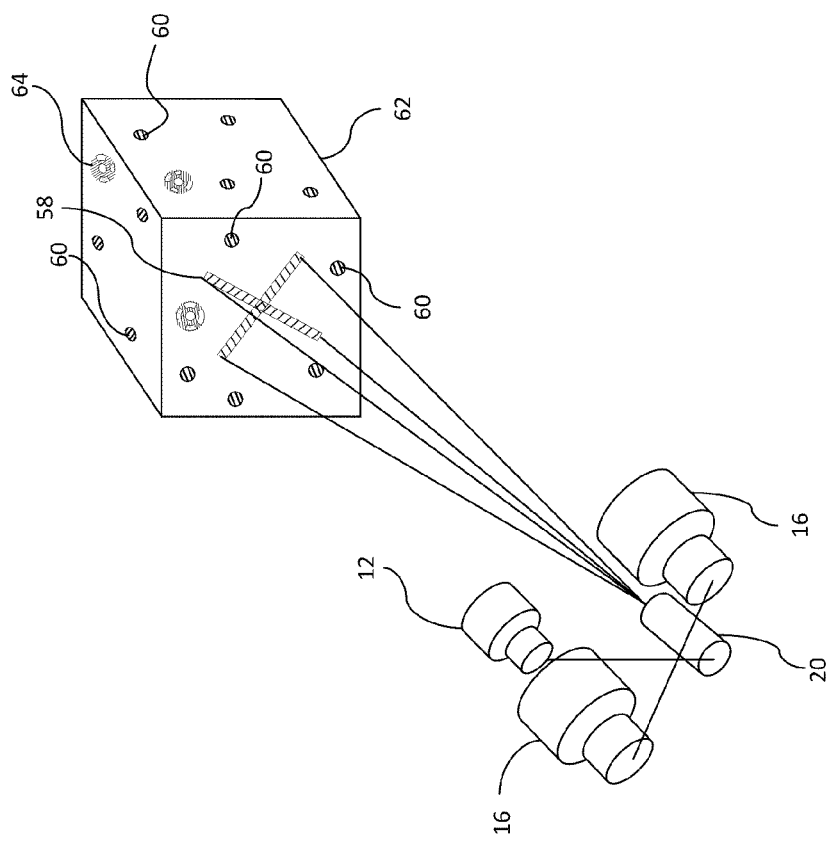
FIG. 6 comprises FIGS. 6A and 6B which illustrate an example embodiment in use with an object on which are affixed sets of positioning markers, non-coded markers being used in FIG. 6A and a combination of coded and non-coded markers being used in FIG. 6B.
Figure 6A:
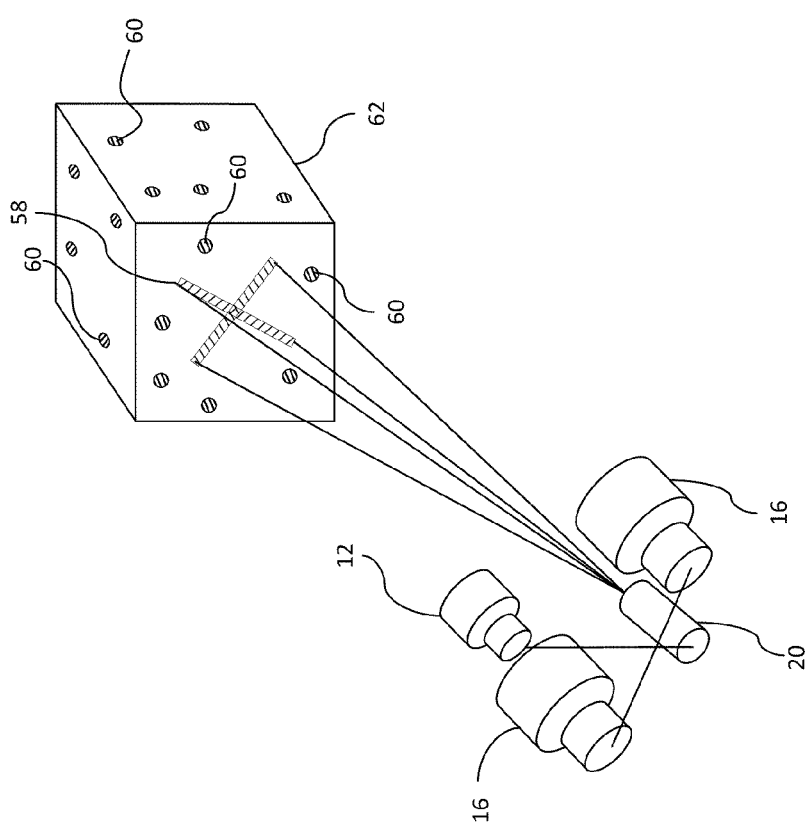

FIG. 6A and FIG. 6B illustrate two situations where in FIG. 6A no coded reference markers are used while a combination of coded 64 and non-coded 60 reference markers are used in FIG. 6B. FIGS. 6A and 6B further depict the projected laser pattern 58 which is a crosshair in this illustrated case. The crosshair is reflected from the object 62. In FIGS. 6A and 6B, a representation of the scanning apparatus is seen from the back. The laser pattern projector 20 projects the crosshair onto the object. This pattern is observed by the two basic cameras 16 along with the reference markers. A model of the reference markers has been built formerly using the photogrammetric camera 12.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

The invention claimed is:

1. A hand-held self-referenced scanning apparatus for three-dimensional scanning of an object, said hand-held scanning apparatus comprising:

a first light source for illuminating at least one marker of a set of retro-reflective markers, wherein each marker of said set of retro-reflective markers is provided at a fixed position one of on and near said object, said first light source being adapted to illuminate said marker at a photogrammetric modeling distance of more than 75 cm to said object;

a photogrammetric high-resolution camera for acquiring and storing at least one photogrammetric image of said object, said photogrammetric high-resolution camera cooperating with said first light source, wherein at least a portion of said set of retro-reflective markers is apparent on said photogrammetric image, said photogrammetric high-resolution camera being adapted to acquire said photogrammetric image at said photogrammetric modeling distance;

a pattern projector for providing a projected pattern on a surface of said object;

at least a pair of second light sources, each said second light sources for illuminating at least one marker of said set of retro-reflective markers, said second light source being adapted to illuminate said marker at a surface scanning distance of less than 60 cm from said object;

at least a pair of cameras for acquiring and storing 2D images of said object, one 2D image from each camera, each said camera cooperating with one of said second light sources, wherein said projected pattern and at least a portion of said set of retro-reflective markers is apparent on said 2D images, a spatial relationship between said pair of cameras being known, said cameras being adapted to acquire said 2D images at said surface scanning distance;

a frame for holding in position said first light source, said photogrammetric high-resolution camera, said pattern projector, said cameras and said at least a pair of second light sources within said hand-held apparatus, said frame having a handle, said frame allowing support and free movement of said scanning apparatus by a user;

whereby said user may freely handle said hand-held self-referencing scanning apparatus to build a 3D model of said markers and then obtain dense sets of 3D surface points from said 2D images.

2. The hand-held self-referenced scanning apparatus as claimed in claim 1, further comprising a control circuit for controlling operation of said first light source, said photogrammetric high-resolution camera, said pattern projector, said at least said pair of second light sources and said at least said pair of cameras, said control circuit being mounted to said frame.

3. The hand-held self-referenced scanning apparatus as claimed in claim 1, wherein said frame is adapted to allow single-handed handling of said scanning apparatus.

4. The hand-held self-referenced scanning apparatus as claimed in claim 1, further comprising a casing for said scanning apparatus, said casing protecting said frame, said photogrammetric high-resolution camera, said pattern projector, said cameras and said at least a pair of second light sources and providing said handle.

5. The hand-held self-referenced scanning apparatus as claimed in claim 1, wherein said first light source is coaxial with said photogrammetric camera.

6. The hand-held self-referenced scanning apparatus as claimed in claim 1, wherein said second light source is coaxial with said camera.

7. The hand-held self-referenced scanning apparatus as claimed in claim 1, wherein said first light source is a ring light source surrounding said photogrammetric high-resolution camera.

8. The hand-held self-referenced scanning apparatus as claimed in claim 1, wherein said at least two second light sources are ring light sources each surrounding one of said at least a pair of cameras.

9. The hand-held self-referenced scanning apparatus as claimed in claim 2, further comprising switches for actuating said controller.

10. The hand-held self-referenced scanning apparatus as claimed in claim 9, wherein said switches are provided at separate locations on said frame.

11. The hand-held self-referenced scanning apparatus as claimed in claim 7, wherein said first light source is a ring having at least two Light Emitting Diodes (LED).

12. The hand-held self-referenced scanning apparatus as claimed in claim 8, wherein said second light sources are rings each having at least two Light Emitting Diodes (LED).

13. The hand-held self-referenced scanning apparatus as claimed in claim 1, wherein said pattern projector is a laser pattern projector and wherein said projected pattern is a laser pattern.

14. The hand-held self-referenced scanning apparatus as claimed in claim 13, wherein said laser pattern projector projects a laser crosshair pattern on said object.

15. The hand-held self-referenced scanning apparatus as claimed in claim 2, further comprising at least one status indicator activated by said controller for indicating a status of said scanning apparatus.

16. The hand-held self-referenced scanning apparatus as claimed in claim 1, further comprising a hub for handling transmission of said 2D images and said photogrammetric image.

17. The hand-held self-referenced scanning apparatus as claimed in claim 1, wherein said photogrammetric modeling distance is 1.75 m.

18. The hand-held self-referenced scanning apparatus as claimed in claim 1, wherein said 3D scanning distance is 30 cm.

19. The hand-held self-referenced scanning apparatus as claimed in claim 1, wherein said frame has two perpendicular axes, said cameras being provided at opposite ends of one of said two perpendicular axes, said pattern projector and said photogrammetric camera being provided at opposite ends of another one of said two perpendicular axes, said cameras, said pattern projector, said photogrammetric camera all facing a same direction.

20. A method for three-dimensional scanning of an object, comprising:

obtaining at least one photogrammetric image of said object from a hand-held self-referenced scanning apparatus having:

a first light source for illuminating at least one marker of a set of retro-reflective markers, wherein each marker of said set of retro-reflective markers is provided at a fixed position one of on and near said object, said first light source being adapted to illuminate said marker at a photogrammetric modeling distance of more than 75 cm to said object;

a photogrammetric high-resolution camera for acquiring and storing at least one photogrammetric image of said object, said photogrammetric high-resolution camera cooperating with said first light source, wherein at least a portion of said set of retro-reflective markers is apparent on said photogrammetric image, said photogrammetric high-resolution camera being adapted to acquire said photogrammetric image at said photogrammetric modeling distance;

a pattern projector for providing a projected pattern on a surface of said object;

at least a pair of second light sources, each said second light sources for illuminating at least one marker of said set of retro-reflective markers, said second light source being adapted to illuminate said marker at a surface scanning distance of less than 45 cm from said object;

at least a pair of cameras for acquiring and storing 2D images of said object, one 2D image from each camera, each said camera cooperating with one of said second light sources, wherein said projected pattern and at least a portion of said set of retro-reflective markers is apparent on said 2D images, a spatial relationship between said pair of cameras being known, said cameras being adapted to acquire said 2D images at said surface scanning distance;

a frame for holding in position said first light source, said photogrammetric high-resolution camera, said pattern projector, said cameras and said at least a pair of second light sources within said hand-held apparatus, said frame having a handle, said frame allowing support and free movement of said scanning apparatus by a user;

extracting markers from said at least one photogrammetric images;

building a 3D model of said markers;

obtaining at least two 2D images of said object using said scanning apparatus;

positioning said at least two 2D images of said object in said 3D model of said markers;

extracting dense sets of 3D surface points from said at least two self-referenced 2D images;

whereby said user may freely handle said hand-held self-referencing scanning apparatus to build a 3D model of said markers and then obtain dense sets of 3D surface points from said 2D images.

21. The method as claimed in claim 20, further comprising detecting addition of additional retro-reflective markers on said object in said 2D images and updating said 3D model of markers to add said additional markers.

22. The method as claimed in claim 20, wherein said obtaining at least two 2D images is continuously repeated at predetermined rate once said obtaining is activated, while said scanning apparatus is in operation, wherein said scanning apparatus is displaced by said user while said scanning apparatus is in operation.

23. The method as claimed in claim 20, wherein said obtaining 2D images is performed on non-overlapping sections of said object.

* * * * *